(12) United States Patent
Stockholm Johansson

(10) Patent No.: US 8,985,311 B2
(45) Date of Patent: Mar. 24, 2015

(54) FLIGHT CONVEYOR

(76) Inventor: Palle Stockholm Johansson, Odense NV (DK)

( * ) Notice: Subject to any disclaimer, the term of this patent is extended or adjusted under 35 U.S.C. 154(b) by 0 days.

(21) Appl. No.: 14/343,816

(22) PCT Filed: Sep. 10, 2012

(86) PCT No.: PCT/DK2012/050338
§ 371 (c)(1),
(2), (4) Date: Mar. 7, 2014

(87) PCT Pub. No.: WO2013/037376
PCT Pub. Date: Mar. 21, 2013

(65) Prior Publication Data
US 2014/0238823 A1    Aug. 28, 2014

(30) Foreign Application Priority Data

Sep. 12, 2011   (DK) .............. PA 2011 70499

(51) Int. Cl.
| | |
|---|---|
| *B65G 45/12* | (2006.01) |
| *B65G 17/06* | (2006.01) |
| *B65G 17/18* | (2006.01) |
| *B65G 17/40* | (2006.01) |
| *B65G 21/22* | (2006.01) |

(52) U.S. Cl.
CPC .............. *B65G 45/12* (2013.01); *B65G 17/067* (2013.01); *B65G 17/18* (2013.01); *B65G 17/40* (2013.01); *B65G 21/22* (2013.01); *B65G 2201/0202* (2013.01)
USPC ......................................... 198/497; 198/732

(58) Field of Classification Search
CPC ........ B65G 17/16; B65G 17/18; B65G 45/12; B65G 15/44
USPC ................ 198/494–499, 703–706, 732, 697, 198/690.2
See application file for complete search history.

(56) References Cited

U.S. PATENT DOCUMENTS 2,866,568 A * 12/1958 Bishton .................... 414/523
3,805,420 A *  4/1974 Crum ....................... 198/497

(Continued)

FOREIGN PATENT DOCUMENTS

| AT | 262881 | 6/1968 |
| DE | 73 08 742 | 6/1973 |

(Continued)

OTHER PUBLICATIONS

International Search Report, PCT/DK2012/050338, mailed Dec. 20, 2012.

*Primary Examiner* — William R Harp
(74) *Attorney, Agent, or Firm* — Winston & Strawn LLP

(57) ABSTRACT

A flight conveyor for conveying material includes a frame, drive and idler wheel(s) rotatably mounted on the frame, segments for supporting the material, shafts for pivotally interconnecting the segments to an endless row which has an upper row and a lower row running, during operation, over the drive and idler wheel(s) and a number of conveyor flights for bringing the material along in the conveying direction. A scraper is arranged at the drive wheel for successively scraping off adhered material from segments and flights such that the conveyor can be used for conveying products tending to adhere to the surfaces of the segments and the flights since the adhered products are automatically removed by the scraper.

18 Claims, 4 Drawing Sheets

(56) References Cited

U.S. PATENT DOCUMENTS

| | | |
|---|---|---|
| 6,390,285 B2 * | 5/2002 | de Geus et al. ............... 198/732 |
| 2009/0242358 A1 | 10/2009 | Fourney |
| 2012/0285799 A1 | 11/2012 | Fourney |

FOREIGN PATENT DOCUMENTS

| | | |
|---|---|---|
| DE | 89 15 286 U1 | 5/1990 |
| EP | 1 064 210 B1 | 1/2001 |
| EP | 1 826 159 A1 | 8/2007 |
| FR | 2 448 975 A1 | 9/1980 |
| GB | 415 063 | 8/1934 |
| GB | 2 091 200 | 7/1982 |
| JP | 2000-085938 | 3/2000 |
| WO | WO 2009/120628 A1 | 10/2009 |
| WO | WO 2011/087937 A1 | 7/2011 |

* cited by examiner

FLIGHT CONVEYOR

This application is a 371 filing of International Patent Application PCT/DK2012/050338 filed Sep. 10, 2012, which claims priority to Danish application no. PA 2011 70499 filed Sep. 12, 2011.

BACKGROUND

The invention relates to a flight conveyor of the kind which is arranged for conveying a material from one position to another one and which comprises a frame, at least one drive wheel and at least one idler wheel rotatably mounted on the frame, a number of segments for supporting the material, a number of shafts for pivotally interconnecting the segments to an endless row which has an upper and lower row part and is running, during operation, over the at least one drive wheel and the at least one idler wheel, and a number of conveyor flights for bringing the material along in the conveying direction.

Flight conveyors are generally used for conveying materials from a lower level to a higher level. The conveyors are, owing to that function, frequently called elevators. The orientation of at least a section of such conveyors is inclined. The flights secure the materials against sliding down the conveyor during operation.

The conveyors are inter alia used in the food industry for conveying e.g. piece-formed products such as feta cubes, paste stuffing and paste screws. Such products are often light and also sticky whereby the serious problem arises that some of the products adheres to the surface of the segments and the flights and in this way goes to waste.

The patent publication JP 2000085938 describes a cleaner device for a flight conveyor. The flights have a stationary position in relation to the conveyor. A wiper on one end of a rocker arm is adapted for intermittently scraping dust adhering to the flights. The construction of said known cleaner device is complicated and costly and the intermittent operation of the cleaner device is unstable. A satisfactory result can moreover not be obtained when the conveyor with the cleaner device is used in the food industry where the product to be removed is not dust.

A conveyor with flights mounted on links of chains is known from the publication GB 415063. The flights are angularly displaceable relative to the chains. The angular position changes when passing the sprockets between being perpendicular to the chains and parallel to the chains. The conveyor is adapted for pushing mass material forwards in a duct in the perpendicular state of the flights and back in the parallel state with a reduced cross-sectional area through a smaller return duct. This known conveyor is unsuitable for conveying products in the food industry. The shape of piece-formed products like e.g. feta cubes would easily be destroyed. No cleaning device for cleaning the flights for adhered material is disclosed.

EP 1826159 describes a conveying system comprising a conveyor belt provided with at least one guiding element for moving at least one module over at least part of the conveying path from a normal position to a raised operating position relative to the plane of transport of the conveyor belt. Furthermore, since the guiding elements are connected to the conveyor belt at several points, said elements are not capable of pivoting freely, but only to move at least one module of the conveying path. Accordingly, the known conveyor is adapted for conveying basically bulk objects, and is unsuitable for conveying object from the food industry, which will have a tendency to slide down the belt and be destroyed during the conveying process.

SUMMARY OF THE INVENTION

The above-mentioned disadvantages of the prior art flight conveyors are according to the present invention remedied by in a first aspect of the invention providing a flight conveyor of the kind mentioned in the opening paragraph, which is well suited for being used in the food industry,
in a second aspect of the invention providing a flight conveyor of the kind mentioned in the opening paragraph, which can be used for carefully conveying a piece-formed product,
in a third aspect of the invention providing a flight conveyor of the kind mentioned in the opening paragraph, which can be used for conveying a sticky product with less loss of material than hitherto known,
in a fourth aspect of the invention providing a flight conveyor of the kind mentioned in the opening paragraph with a self-cleaning arrangement,
in a fifth aspect of the invention providing a flight conveyor of the kind mentioned in the opening paragraph in which the cleaning operation proceeds stably and effectively,
in a sixth aspect of the invention providing a flight conveyor of the kind mentioned in the opening paragraph in which the self-cleaning arrangement is simple and inexpensive.

The novel and unique features of the invention consist in the fact that the flights are pivotally mounted on each their shaft, that at least one rail is extending between the idler wheel and the drive wheel in an area below the upper row part, that at least one slide, which is mounted on the back of each flight, seen in the conveying direction, is slidingly supported by the at least one rail, and that removing means is arranged at the drive wheel for successively removing adhered material from segments and flights passing the removing means during operation.

The flights are, since the rails support them, kept in a position preferably perpendicular to the upper row of segments when travelling the distance from the idler wheel to the drive wheel, whereby they effectively can prevent the material from sliding down the conveyor.

When having disengaged the rails the flights are allowed to pivot freely around the axis of their respective shafts and take up a position parallel to the segments when passing the removing means. In order to ensure that the flights are allowed to pivot freely around the axis of their shafts, each flight is preferably connected to only one shaft.

According to the invention, adhered material can in this position be removed from the flights by passing the edge of a scraper, which is close to or is abutting on the surface of the flights. The same scraper is adapted to simultaneously remove adhered material from the surface of the segments which are successively passing the scraper.

Thereby according to the invention, a simple and inexpensive self-cleaning arrangement is obtained, which operates in a stable and effective way.

Another advantage consists in the fact that removed material can be used instead of going to waste as conventionally. Using the flight conveyor according to the invention is therefore very economical especially in the food industry where much and often costly food tends to adhere to the flights and the segments during operation.

According to the invention the segment behind each flight can be formed with a recess corresponding to the shape of the flight so that the front surface of each flight passes the scraper in the same relative level as the surface of the segments whereby adhered material thoroughly can be removed from the flights just as well as from the segments.

The upper face of both ends of the rails can, according to the invention, describe a descending curve. Said curves ensure that the slides of the flights gradually disengage the rails for being brought from a fixed position for example perpendicular to the upper row part of segments to a pivoted position at the drive wheel and that the slides of the flights gradually engage the rails again at the idler wheel for being pivoted back to their previous position on the upper row part of segments.

According to the invention the segment behind each flight is formed with a through slit for allowing the slide of the flight to engage the underlying rail.

The thickness of each flight corresponds, according to the invention, to the width of the slit so that conveyed material is not able to penetrate through the slit.

For the same reason the back of each slide has, according to the invention, a shape like a sector of a circle with the centre placed in the axis of the shafts and a radius having a length corresponding to the distance from the axis of the axle to the distant end of the slit.

Each slide therefore closes the slit in all positions that the slide can occupy during pivoting in the slit.

The pivoting of each slide from the for example perpendicular state on the upper row part of segments to the pivotal state at the drive wheel and back at the idler wheel is best carried out when the slide engages the respective rail with a slide shoe placed at the periphery of slide.

In another embodiment of the invention the shafts of the flight conveyor can be connected to two opposite chains placed at each their side of the rows of segments and each of those chains can run, during operation, over a drive sprocket and an idler sprocket rotatory mounted on the frame of the conveyor belt.

This construction allows each slit to extend transversely over at least the major part of the respective segment and to be open to the previous segment. The slide, which fills up the slit, is then close to or abuts the previous segment.

This implies that said previous segment functions as a scraper removing material adhered to the cylinder face formed back of the slide pivoting in the slit.

BRIEF DESCRIPTION OF THE DRAWINGS

The object, features and advantages of the invention will be explained in more details in the following with reference to the drawing in which.

DETAILED DESCRIPTION OF THE INVENTION

Figure 2:
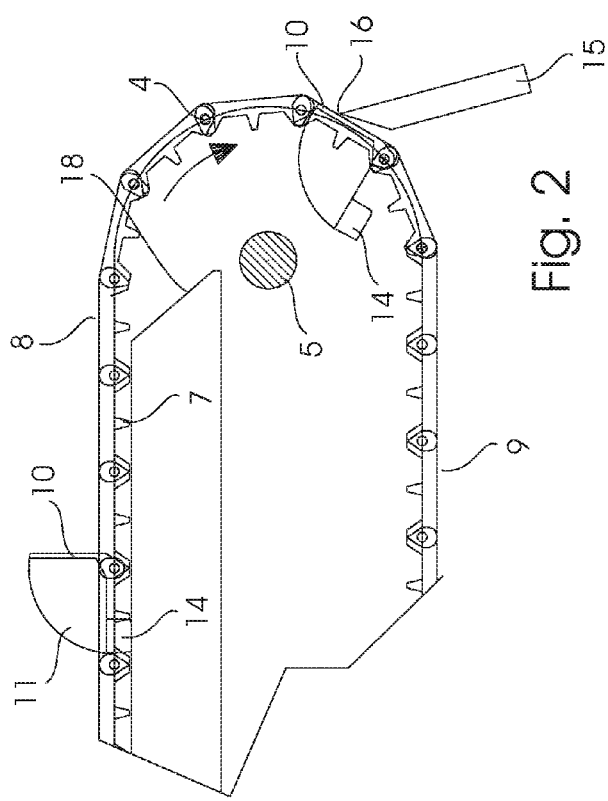
FIG. 2 is a fragmentary lateral view of the drive wheel section of the flight conveyor according to the invention.
Figure 1:
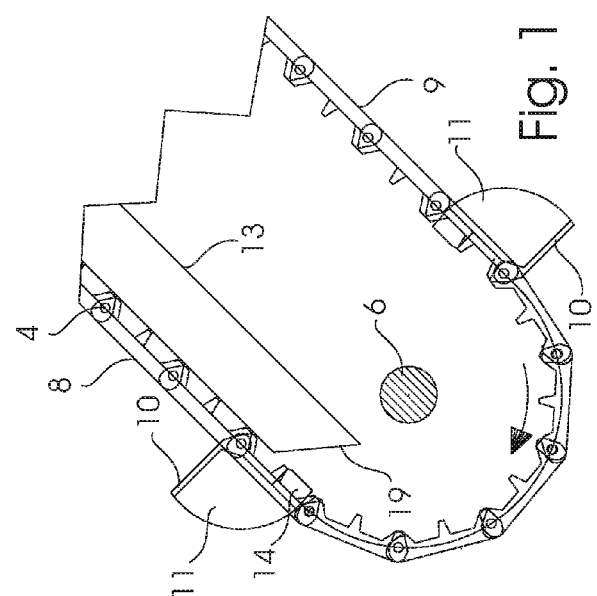
FIG. 1 is a fragmentary lateral view of the idler wheel section of the flight conveyor according to the invention.
Figure 3:
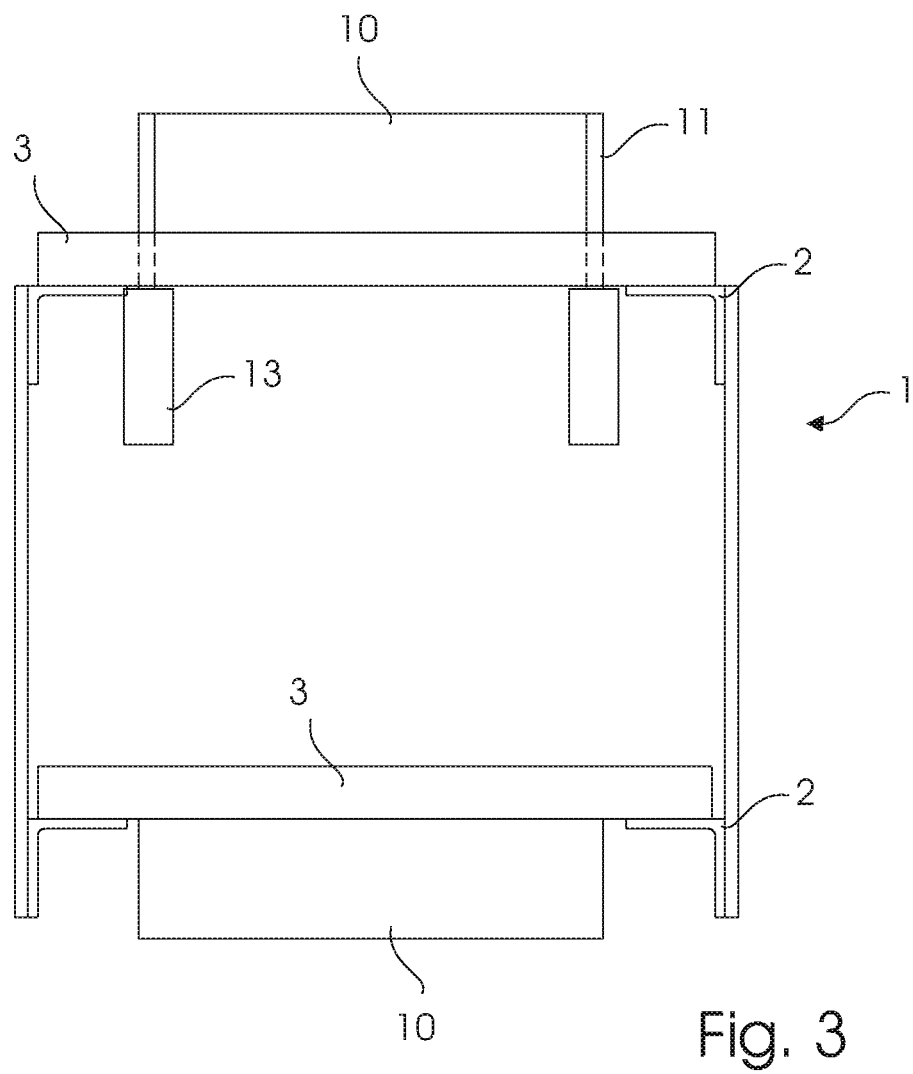
FIG. 3 shows a section taken along the line III-III in FIG. 2.

FIGS. 1, 2 and 3 show that the flight conveyor according to the invention comprises a frame 1 with supports 2 for slidingly carrying a number of segments 3 which by means of shafts 4 are connected to each other and in an endless row are running over drive sprockets 5 and an idler sprockets 6 during operation as the drive sprocket engages teeth 7 formed on the underside of the segments.

Only the axle 5 and the axle 6 of respectively the drive— and idler sprockets are seen in the figures.

The row of segments has an upper row part 8 and a lower row part 9. The segments of the upper row part serve as support for the material (not shown) to be conveyed from a lower position at the idler sprockets 6 to a higher position at the drive sprockets 5.

The conveyor is, as can be seen in FIGS. 1 and 2, at the beginning tilting so that the material can be elevated to the wanted level. At this level the conveyor is extending into a horizontal direction above e.g. a container (not shown) for collecting the conveyed material.

To prevent the conveyed material from sliding down the tilted part of the conveyor during operation the conveyor is equipped with flights 10 which are pivotally mounted on each their shaft 4.

Figure 4:
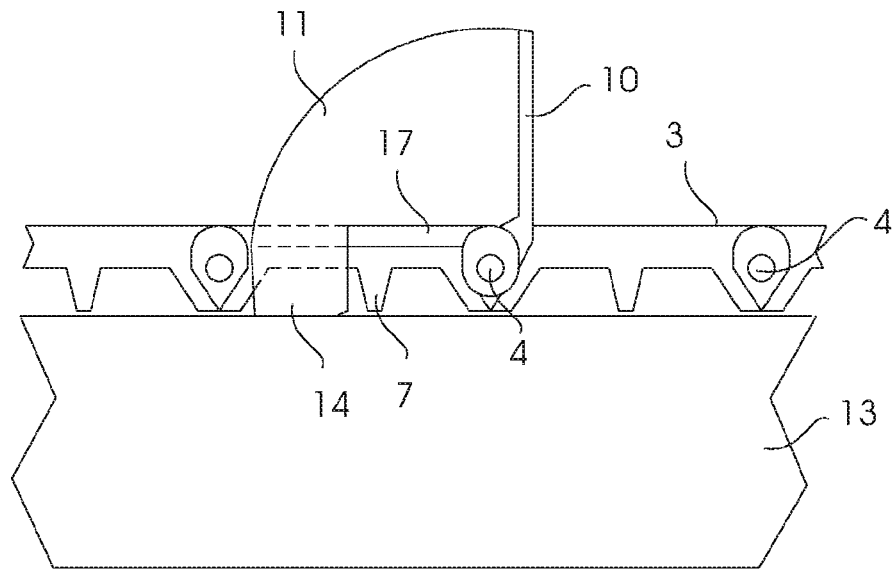
FIG. 4 is a lateral view of a fragment of the upper part of the flight conveyor according to the invention in one embodiment.
Figure 5:
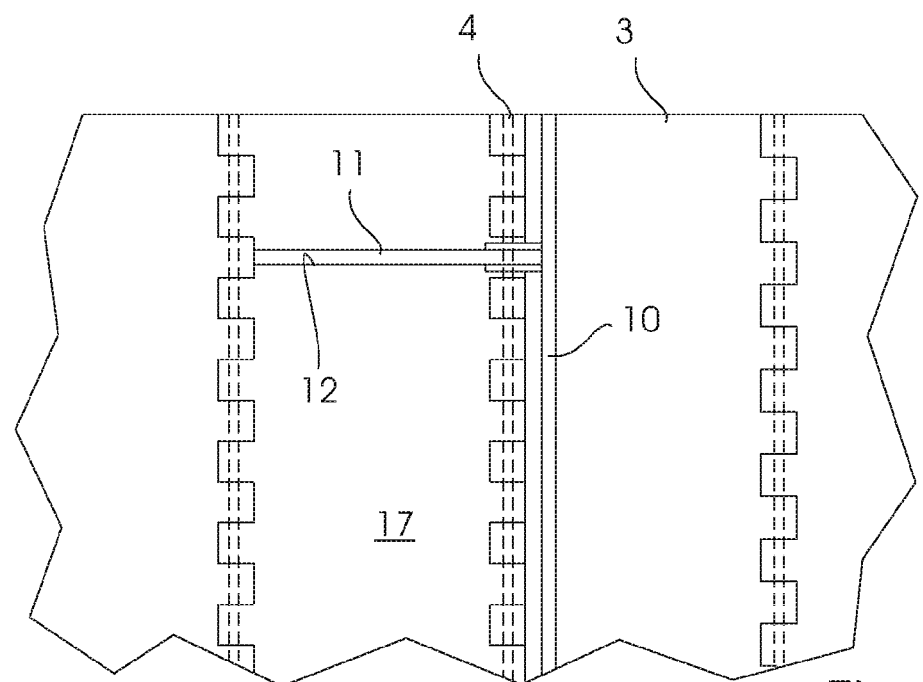
FIG. 5 shows the same seen from above.

FIGS. 4 and 5 show that each flight has a shape like a plate. On the back of the flight is mounted a slide 11 which extends through a slit 12 in the previous segment.

The width of the slit corresponds to the width of the slide. The back of each slide moreover has a shape like a sector of a circle with the centre placed in the axis of the shafts and a radius having a length corresponding to the distance from the axis of the axle to the distant end of the slit.

This implies that the slide fills the slit and that conveyed material therefore is not able to penetrate through the slit.

In this case two rails 13 are extending between the idler sprocket 6 and the drive sprocket 5 below the upper row part 8. Each slide 11 is moreover formed with a slide shoe 14.

The slide shoes 14 of the slides 11 are sliding on the rails 13 while travelling the distance from the idler sprocket to the drive sprocket whereby the flights 10 are kept in a perpendicular position in relation to the upper row of segments. In this position the flights are effectively able to prevent the conveyed material from sliding down the tilted part of the conveyor and safely bring the material along in the conveying direction.

Some materials are rather sticky, for example piece-formed products like feta cubes, paste stuffing and paste screws. The products usually go to waste when they during operation adhere to the surface of the segments and the flights of the conveyor.

As can be seen in FIG. 2, a scraper 15 with an edge 16 according to the invention is provided at the drive sprocket 5 for overcoming this problem. Adhered products are, by means of the edge of the scraper, scraped off the surfaces of the segment and flights passing the scraper during operation. The removed products are collected in e.g. a container and can be utilized as well as the other conveyed products.

Each flight has, as mentioned above, a shape like a plate. In the segment behind the flight is formed a recess 17 corresponding to the shape of this plate. The recess can therefore accommodate the flight.

The upper face of the rail 1 extends at the drive sprocket 5 into a descending curve 18 whereby the slide shoe 14 of the slide 11 gradually leaves the rail with the result that the flight at the scraper is pivoted into the recess 17 of the previous segment with the surface on a level with the surface of the other segments.

The edge 16 of the scraper 15 is placed close to or is abutting the surfaces of the flights and segments successively passing the scraper thereby removing adhered products.

At the idler sprocket the slide shoe 14 of each slide 11 gradually engages an opposite curve 19 on the rail 13 whereby the flight 10 is turned back to the position perpendicular on the upper row of segments 8.

Figure 6:
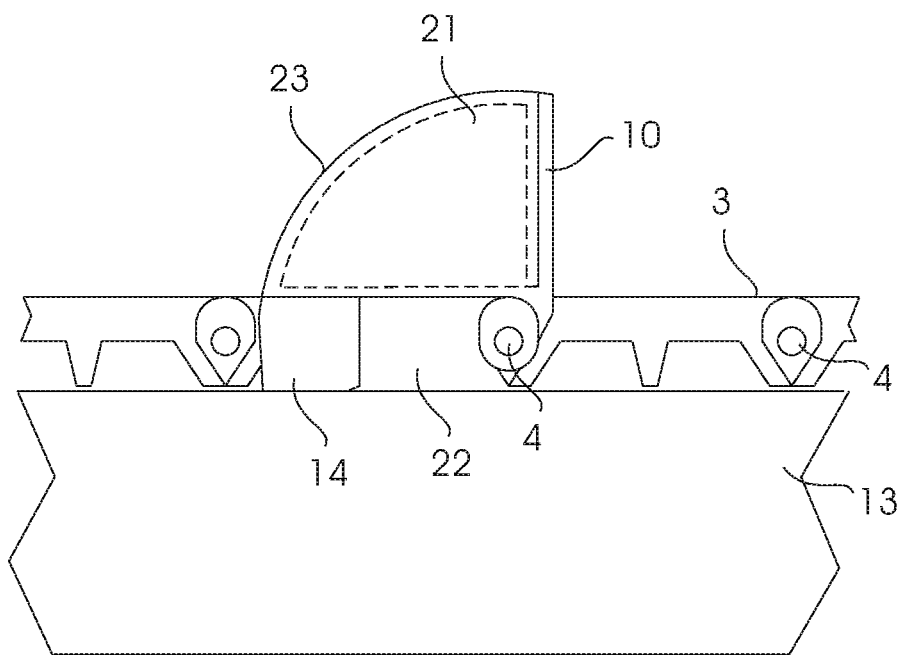
FIG. 6 is a lateral view of a fragment of the upper part of the flight conveyor according to the invention in another embodiment.
Figure 7:
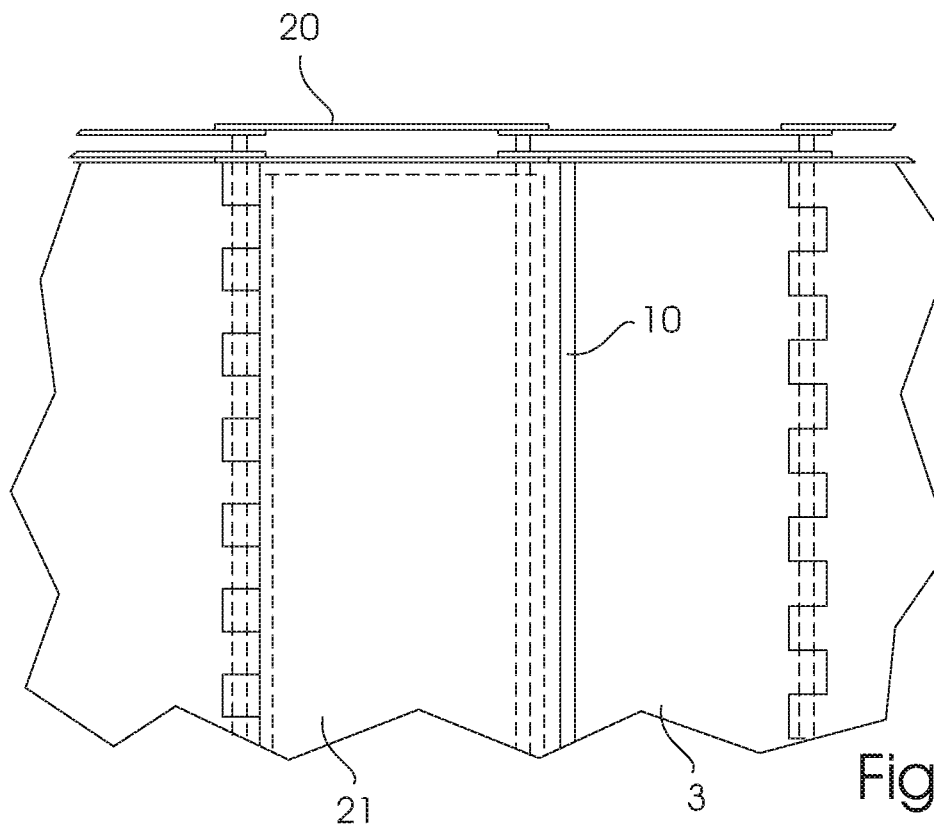
FIG. 7 shows the same seen from above.

FIGS. 6 and 7 show fragmentarily another embodiment of the flight conveyor according to the invention. This embodiment corresponds in the main to the embodiment shown in FIGS. 4 and 5. Identical parts therefore are denoted with same numerals.

In this case the shafts 4 of the flight conveyor are connected to two opposite chains 20 placed at each their side of the rows of segments. FIG. 7 shows only one of said chains.

During operation each chain is running over a drive sprocket (not shown) and an idler sprocket (not shown) rotatably mounted on the frame of the conveyor belt.

Each slide 21 has a width corresponding to the width of the segments between the chains. The slide can be massive but is in the example shown formed as a tube, the end of which may be closed.

Instead of a slit in the previous segment as shown in FIGS. 4 and 5, said segment has, in this case, been removed leaving a through opening 22 for allowing the slide 21 of the flight 10 to engage the underlying rail 13.

The slide fills the through opening so that the cylinder face formed back 23 of the slide is passing close by the adjoining segment when the flight is pivoting in said opening during operation whereby products adhered to the back of the slide are removed.

In the figures it is shown and above is supposed that each segment is extending over the total width of the flight conveyor in one piece. The segment can however, within the scope of the invention, consist of more pieces that in all are extending over the total width of the flight conveyor.

What is claimed is:

1. A flight conveyor of the kind which is arranged for conveying a material from one position to another, comprising,
a frame,
at least one drive wheel and at least one idler wheel rotatably mounted on the frame,
a number of segments for supporting the material,
a number of shafts for pivotally interconnecting the segments to an endless row which has an upper row part and lower row part and is running, during operation, over the at least one drive wheel and the at least one idler wheel, and
a number of conveyor flights for bringing the material along in the conveying direction, wherein:
the flights are pivotally mounted on each shaft,
the segment behind each flight is formed with a least one through slit which fits the slide on the flight,
at least one rail is extending between the idler wheel and the drive wheel in an area below the upper row part,
at least one slide, which is mounted on the back of each flight, seen in the conveying direction, is slidingly supported by the at least one rail,
removing means is arranged at the drive wheel for successively removing adhered material from segments and flights passing the removing means during operation, and
the flights can pivot freely around their shaft when transported between the removing means and the at least one rail.

2. A flight conveyor according to claim 1, wherein the at least one rail is only extending between the idler wheel and the drive wheel in an area below the upper row part.

3. A flight conveyor according to claim 1, wherein the removing means comprises at least one scraper having an edge which is close to or abuts the surface of segments and flights passing the scraper.

4. A flight conveyor according to claim 1, wherein the back of each slide has a shape like a sector of a circle with the centre placed in the axis of the shafts and a radius having a length corresponding to the distance from the axis of the axle to the distant end of the slit.

5. A flight conveyor according to claim 1, wherein the height of each flight measured from the axis of the shaft corresponds to the radius of the sector of circle of the slide.

6. A flight conveyor according to claim 1, wherein the segment behind each flight is formed with a recess corresponding at least in the main to the shape of the flight.

7. A flight conveyor according to claim 1, wherein the upper face of both ends of the at least one rail extends into a descending curve.

8. A flight conveyor according to claim 1, wherein each slide is equipped with a slide shoe for sliding on the rail during operation.

9. A flight conveyor of the kind which is arranged for conveying a material from one position to another, comprising,
a frame,
at least one drive wheel and at least one idler wheel rotatably mounted on the frame,
a number of segments for supporting the material,
a number of shafts for pivotally interconnecting the segments to an endless row which has an upper row part and lower row part and is running, during operation, over the at least one drive wheel and the at least one idler wheel, wherein the shafts of the flight conveyor are connected to two opposite chains placed at each their side of the rows of segments, and that each chain, during operation, is running over a drive sprocket and an idler sprocket rotatably mounted on the frame of the conveyor belt, and
a number of conveyor flights for bringing the material along in the conveying direction, wherein:
the flights are pivotally mounted on each shaft,
at least one rail is extending between the idler wheel and the drive wheel in an area below the upper row part,
at least one slide, which is mounted on the back of each flight, seen in the conveying direction, is slidingly supported by the at least one rail,
a scraper is arranged at the drive wheel for successively removing adhered material from segments and flights passing the scraper during operation, and
the flights can pivot freely around their shaft when transported between the scraper and the at least one rail.

10. A flight conveyor according to claim 9, wherein each slide has a width corresponding to the width of the segments between the chains and that the previous segment has been removed.

11. A flight conveyor according to claim 9, wherein the segment behind each flight is formed with a recess corresponding at least in the main to the shape of the flight.

12. A flight conveyor according to claim 9, wherein the upper face of both ends of the at least one rail extends into a descending curve.

13. A flight conveyor according to claim 9, wherein each slide has a width corresponding to the width of the segments between the chains and that the previous segment has been removed.

14. A flight conveyor of the kind which is arranged for conveying a material from one position to another, comprising, a frame, at least one drive wheel and at least one idler wheel rotatably mounted on the frame, a number of segments for supporting the material, a number of shafts for pivotally interconnecting the segments to an endless row which has an upper row part and lower row part and is running, during operation, over the at least one drive wheel and the at least one idler wheel, and a number of conveyor flights for bringing the material along in the conveying direction, wherein:

the flights are pivotally mounted on each shaft, the segment behind each flight is formed with a least one through slit which fits the slide on the flight, at least one rail extends between the idler wheel and the drive wheel in an area below the upper row part, at least one slide, which is mounted on the back of each flight, seen in the conveying direction, is slidingly supported by the at least one rail, a scraper is arranged at the drive wheel for successively removing adhered material from segments and flights passing the scraper during operation, and the flights can pivot freely around their shaft when transported between the scraper and the at least one rail.

15. A flight conveyor according to claim 14, wherein the back of each slide has a shape like a sector of a circle with the centre placed in the axis of the shafts and a radius having a length corresponding to the distance from the axis of the axle to the distant end of the slit.

16. A flight conveyor according to claim 14, wherein the segment behind each flight is formed with a recess corresponding at least in the main to the shape of the flight.

17. A flight conveyor according to claim 14, wherein the upper face of both ends of the at least one rail extends into a descending curve.

18. A flight conveyor according to claim 14, wherein each slide has a width corresponding to the width of the segments between the chains and that the previous segment has been removed.

* * * * *